United States Patent
Hsu et al.

(10) Patent No.: US 6,956,093 B1
(45) Date of Patent: Oct. 18, 2005

(54) PREPARATION OF SYNDIOTACTIC POLYBUTADIENE, RUBBER COMPOSITION AND TIRE WITH RUBBER COMPONENT

(75) Inventors: Wen-Liang Hsu, Cuyahoga Falls, OH (US); Adel Farhan Halasa, Bath, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/977,750

(22) Filed: Oct. 29, 2004

(51) Int. Cl.$^7$ ............................ C08F 136/06; C08F 6/06
(52) U.S. Cl. ..................... 526/335; 526/84; 526/136; 526/142; 525/236; 525/237; 525/247; 525/261; 525/313; 528/490
(58) Field of Search ................ 526/84, 136, 142, 526/335; 525/236, 237, 247, 261, 313; 152/450; 528/490

(56) References Cited

U.S. PATENT DOCUMENTS

| | | | |
|---|---|---|---|
| 3,778,424 A | 12/1973 | Sugiura, et al. | 260/94.3 |
| 5,283,294 A | 2/1994 | Hsu et al. | 525/247 |
| 5,307,850 A | 5/1994 | Halasa et al. | 152/209 |

*Primary Examiner*—Fred Teskin
(74) *Attorney, Agent, or Firm*—Henry C. Young, Jr.

(57) ABSTRACT

The present invention relates to the preparation of syndiotactic 1,2-polybutadiene polymer using a catalyst containing a carbon disulfide in which the polymerizate thereof is treated with hydrogen peroxide, to preparation of a composite of conjugated diene-based elastomer and syndiotactic 1,2-polybutadiene polymer using a catalyst containing a carbon disulfide which the polymerizate thereof is treated with hydrogen peroxide, a rubber composition containing said syndiotactic 1,2-polybutadiene polymer and/or said composite and a tire having at least one rubber component thereof.

14 Claims, No Drawings

PREPARATION OF SYNDIOTACTIC POLYBUTADIENE, RUBBER COMPOSITION AND TIRE WITH RUBBER COMPONENT

FIELD OF THE INVENTION

The present invention relates to the preparation of syndiotactic 1,2-polybutadiene polymer using a catalyst containing a carbon disulfide in which the polymerizate thereof is treated with hydrogen peroxide, to preparation of a composite of conjugated diene-based elastomer and syndiotactic 1,2-polybutadiene polymer using a catalyst containing a carbon disulfide which the polymerizate thereof is treated with hydrogen peroxide, a rubber composition containing said syndiotactic 1,2-polybutadiene polymer and/or said composite and a tire having at least one rubber component thereof.

BACKGROUND OF THE INVENTION

Syndiotactic 1,2-polybutadiene polymer is crystalline thermoplastic resin that has a stereoregular structure in which the side chain vinyl 1,2- groups are located alternately on opposite sides in relation to the polymeric main chain. Syndiotactic 1,2-polybutadiene is a unique polymeric material what exhibits various physical properties of both plastics and rubber and, therefore, has many uses. For example, syndiotactic 1,2-polybutadiene can be beneficially blended with various diene-based elastomers for use in various articles of manufacture, including tires having one or more components thereof.

Syndiotactic 1,2-polybutadiene may be prepared, for example, by polymerizing 1,3-butadiene monomer in an organic solvent solution in the presence of a catalyst system containing a trialkylaluminum, a cobalt carboxylate and carbon disulfide. For example, see U.S. Pat. No. 3,778,424 for preparation of syndiotactic 1,2-polybutadiene polymer. See also U.S. Pat. Nos. 5,307,850 and 5,283,294 for preparation of a composite of conjugated diene-based elastomer and syndiotactic 1,2-polybutadiene polymer.

However use of the volatile carbon disulfide in such catalyst system presents a challenge in a sense because of its inherently relatively obnoxious odor.

For this invention, the preparation of syndiotactic 1,2-polybutadiene in an organic solvent solution in the presence of a carbon disulfide-containing catalyst system is made more environmentally acceptable in a sense of a significantly reduced obnoxious odor associated with such use.

For the description of this invention, the term "polymerizate" means a polymerization reaction medium comprised of an organic solvent solution of polymerized monomers (e.g. isoprene and 1,3-butadiene) and an accompanying live catalyst system.

Disclosure and Practice of the Invention

In accordance with this invention, in a process is provided for the preparation of syndiotactic 1,2-polybutadiene polymer which comprises polymerizing 1,3-butadiene in an organic solvent solution in the presence of a catalyst system comprised of a combination of cobalt carboxylate, trialkyl aluminum, carbon disulfide and, optionally dialkylfumarate, to form a polymerizate thereof and thereafter recovering said syndiotactic 1,2-polybutadiene from said polymerizate;

wherein said process further comprises adding hydrogen peroxide to said polymerizate.

As would be understood by one having skill in such art, at least a stoichiometric amount of the hydrogen peroxide would be used relative to said carbon disulfide and preferably a reasonable excess over and above such stoichiometric amount and, further that the hydrogen peroxide be preferably added at a temperature in a range of about, for example, 23° C. to about 50° C. to oxidize the organic sulfide(s) to, for example sulfoxides and/or sulfates.

While the hydrogen peroxide is the preferred oxidizing agent for this invention based on cost, efficiency and availability without leaving its residue in the resulting product, other less advantageous oxidizing agents might possibly be considered but which may leave residues such as for example, potassium permangenate (may leave manganese residue which may be difficult and costly to remove), as well as chlorine gas (which may be toxic and may change the composition of the resulting product), and potassium perchlorate.

In practice, the said addition of hydrogen peroxide may be added to said polymerizate as a mixture comprised of hydrogen peroxide and water and/or alcohol, preferably alcohol, wherein said alcohol comprised of at least one of ethanol and isopropanol.

In further accordance with this invention, a syndiotactic 1,2-polybutadiene polymer prepared by said process is provided.

In additional accordance with this invention, a tire is provided which contains at least one component comprised of a rubber composition which contains said syndiotactic 1,2-butadiene polymer.

It is considered herein that said hydrogen peroxide reacts with said carbon disulfide, particularly unreacted carbon disulfide, which may include one or more byproducts of said carbon disulfide thereof, to significantly reduce the level (essentially eliminating the level) of obnoxious odor which would otherwise be stemming from said carbon disulfide (e.g. unreacted carbon disulfide).

It is considered herein that said hydrogen peroxide also acts to inactivate said catalyst system and stop said polymerization reaction.

Alternatively, when said hydrogen peroxide is added as a solution comprised of water and/or said alcohol water and/or alcohol also acts to inactivate said catalyst system to stop said polymerization reaction to therefore prevent further formation of said polymerizate.

In practice, said cobalt carboxylate may be, for example, selected from cobalt octanoate, cobalt naphthenate and cobalt acetylacetonate, preferably cobalt octanoate.

In practice, said trialkylaluminum may be, for example, selected from triethylaluminum and triisobutylaluminum, preferably triisobutylaluminum.

In practice, said optional dialkyl fumarate may be, for example, selected from dimethyl fumarate, diethyl fumarate and dibutyl fumarate, preferably diethyl fumarate.

Accordingly, said catalyst system may be, for example, comprised of the product of a combination of cobalt naphthenate, triisobutyl aluminum and carbon disulfide as well as, optionally, diethyl fumarate.

A significant aspect of this invention is the aforesaid addition of the simple hydrogen peroxide, preferably in said simple alcohol solution thereof, for aforesaid reaction with said carbon disulfide and perhaps also with byproducts of said carbon disulfide.

Such significant aspect of the invention is amplified by an inclusion of the use of the dialkylfumarate in the catalyst system combination which, in turn allows the reduced amount of the carbon disulfide in the catalyst system combination to effectively polymerize the 1,3-butadiene to form the syndiotactic 1,2-polybutadiene polymer and to thereby further reduce obnoxious odor stemming from the carbon disulfide.

In practice, various acceptable inert organic solvents may be used for said polymerization, representative of which are, for example, hexane, pentane, cyclohexane and toluene.

The polymerization may be conducted, for example, at atmospheric pressure or above atmospheric pressure.

The polymerization may be conducted, for example, at a constant temperature or variable temperature in a range of, for example, from about 0° C. to about 60° C.

In a further accordance with this invention, a process comprises preparing a composite of conjugated diene-based elastomer and syndiotactic 1,2-polybutadiene polymer comprised of first polymerizating at least one of isoprene and 1,3-butadiene monomers, or styrene and at least one of isoprene and butadiene monomers, in an organic solvent solution to form a polymerizate containing an elastomer thereof followed an addition of 1,3-butadiene monomer and said catalyst comprised of said trialkyl aluminum, cobalt carboxylate and carbon disulfide, and optionally said dialkyl fumarate, and polymerizing said added 1,3-butadiene to form a syndiotactic 1,2-polybutadiene polymer, wherein the resulting polymerizate of said conjugated diene-based elastomer and syndiotactic 1,2-polybutadiene polymer is treated with hydrogen peroxide, followed by recovering said composite from said polymerizate.

In practice, then, said conjugated diene-based elastomer of said composite may be, for example, cis 1,4-polyisoprene, cis 1,4-polybutadiene, isoprene/butadiene copolymer, styrene/isoprene/butadiene terpolymer or styrene/butadiene copolymer.

It is considered herein that said hydrogen peroxide treatment of said polymerizate renders it relatively odorless insofar as a significant level of obnoxious odor stemming from said carbon disulfide is concerned.

Said composite (hydrogen peroxide treated composite) of said conjugated diene-based elastomer and syndiotactic 1,2-butadiene polymer is then recovered from said polymerizate.

It is considered herein that said hydrogen peroxide treatment of said polymerizate renders said recovered composite relatively odorless insofar as a significant level of obnoxious odor stemming from said carbon disulfide is concerned.

In additional accordance with this invention, said composite of conjugated diene-based elastomer and syndiotactic 1,2-polybutadiene polymer prepared by said process is provided.

In further accordance, a rubber composition is provided containing said composite of conjugated diene-based elastomer and syndiotactic 1,2-polybutadiene polymer is provided, particularly as prepared by the process of this invention (e.g. a rubber composition comprised of said composite, at least one additional conjugated diene-based elastomer and reinforcing filler such as for example rubber reinforcing fillers comprised of at least one of rubber reinforcing carbon black and precipitated silica and any combination of the two reinforcing fillers).

In additional accordance with this invention, a tire is provided which contains at least one rubber component comprised of a rubber composition which contains said syndiotactic 1,2-polybutadiene copolymer prepared by the process of this invention. (e.g. which also contains at least one additional conjugated diene-based elastomer and reinforcing filler comprised of at least one of rubber reinforcing carbon black and precipitated silica together with a coupling agent for said precipitated silica).

In additional accordance with this invention, a tire is provided which contains at least one rubber component comprised of a rubber composition which contains said composite of conjugated diene-based elastomer and syndiotactic 1,2-butadiene polymer, particularly as prepared by the process of this invention. (e.g. which also contains at least one additional conjugated diene-based elastomer and reinforcing filler comprised of at least one of rubber reinforcing carbon black and precipitated silica together with a coupling agent for said precipitated silica).

It is to be appreciated that said tire rubber component may be, for example, a tire tread, tire sidewall, internal tire sidewall apex and internal tire sidewall insert particularly as being spaced apart from a tire bead component.

The invention may be better understood by reference to the following example in which the parts and percentages are by weight unless otherwise indicated.

BACKGROUND EXAMPLE I

Comparative Example of Preparation of Syndiotactic 1,2-Polybutadiene Polymer

A syndiotactic 1,2-polybutadiene polymer is prepared by polymerization of 1,3-butadiene in an organic solvent (e.g. hexane) solution in the presence of a catalyst system composed of a combination of tri-isobutylaluminum, cobalt octanoate and carbon disulfide.

In a suitable container, 1,3-butadiene monomer in hexane solvent is provided. To the container is then introduced tri-isobutylaluminum and cobalt octanoate followed by an addition of carbon disulfide, with agitation.

The polymerization proceeds to form a polymer cement as a polymerizate comprised of the organic solvent (hexane), syndiotactic 1,2-polybutadiene polymer and live catalyst system.

The polymerization of the 1,3-butadiene monomer is shortstopped by addition of ethanol or isopropanol to the polymer cement (polymerizate). The shortstopped polymerizate is removed from the container and the solvent (hexane) is removed by evaporation under atmospheric conditions. The recovered syndiotactic 1,2-polybutadiene polymer is further dried in a vacuum oven.

A significant obnoxious odor attributable to the use of the carbon disulfide catalyst component is evident during the polymerization of the 1,3-butadiene.

EXAMPLE II

Preparation of Relatively Odorless Syndiotactic 1,2-Polybutadiene Polymer (SPBD)

A 1,3-butadiene monomer in hexane solvent is provided in a 4 ounce (118 cc) glass bottle with a suitable cap. In particular, 116 grams (g) of 18.6 weight percent 1,3-butadiene monomer in hexane was charged to a dried 4 ounce (118 cc) glass bottle.

To the bottle was added, at room temperature (e.g. about 23° C.) catalyst components in a sequential order of 2.4 ml of 25 weight percent tri-isobutyl aluminum (TIBA) in hexane, 0.1 ml of a 0.42 molar (M) solution of cobalt octanoate in hexane followed by 2.5 ml of 0.166 molar (M) solution of carbon disulfide in hexane. The calculated molar ratios of the TIBA to the cobalt octanoate and of the carbon disulfide to the cobalt octanoate were about 50/1 and 10/1, respectively. The calculated amount of the cobalt octanoate was about 0.17 minimoles per 100 grams of the 1,3-butadiene monomer.

The reaction mixture in the capped glass bottle was shaken at room temperature (e.g. about 23° C.) for about 2 hours via a mechanical shaker as the polymerization of the 1,3-butadiene monomer was allowed to proceed.

To the polymerization mixture containing a visible insoluble white colored syndiotactic 1,2-polybutadiene polymer (SPBD) in the glass bottle was then added 0.3 ml of 30 weight percent hydrogen peroxide solution in water.

The resulting syndiotactic 1,2-polybutadiene polymer was isolated by decanting the hexane solvent, washing the isolated polymer by washing with hexane and then drying overnight at about 50° C. in a vacuum oven to further remove the hexane solvent.

The syndiotactic 1,2-polybutadiene polymer in an amount of 13 grams was recovered which represented a 62 percent yield, based upon the original 1,3-butadiene monomer. The recovered syndiotactic 1,2-butadiene polymer was determined by a differential scanning calorimeter (DSC) to have a melting temperature of about 203.5° C.

The recovered syndiotactic 1,2-butadiene polymer was observed to be odorless in a sense of not having an obnoxious odor attributable to the use of the carbon disulfide catalyst component.

Accordingly, a neat odorless (relatively odorless insofar as a significant level of obnoxious odor stemming from said carbon disulfide) syndiotactic 1,2- polybutadiene polymer was prepared in which hydrogen peroxide was used to both shortstop the polymerization reaction and also to react with unreacted carbon disulfide without degrading the syndiotactic 1,2-polybutadiene polymer itself.

EXAMPLE II

Preparation of Relatively Odorless Syndiotactic 1,2-Polybutadiene Polymer (SPBD)

Four samples of a relatively odorless syndiotactic 1,2-polybutadiene polymer were prepared and identified herein as Samples A through D.

The procedure used in Example I was followed except that a four component catalyst system, in which diethyl fumarate as added, was used with a reduced amount of carbon disulfide.

The four component catalyst system was composed of the sequential addition of triisobutyl aluminum, cobalt octanoate, diethyl fumarate and carbon disulfide.

Samples A through D used varying amounts of the additional ethyl fumarate catalyst component.

The molar ratios cobalt octanoate to 1,3-butadiene and TIBA to cobalt octanoate were the same as for Example I, although the molar ratio of carbon disulfide to cobalt octanoate was reduced to about 1/1 from the 10/1 ratio used in Example I.

The yields of syndiotactic 1,2-polybutadiene polymers together with their melting temperatures (Tm) are reported in the following Table 1.

TABLE 1

| Sample | Diethyl Fumarate/ Cobalt Octanoate Mole Ratio | Carbon Disulfide/ Cobalt Octanoate Mole Ratio | Yield (%) | Tm (° C.) |
|---|---|---|---|---|
| A | 3/1 | 1/1 | 53 | 201.6 |
| B | 5/1 | 1/1 | 69 | 202.1 |

TABLE 1-continued

| Sample | Diethyl Fumarate/ Cobalt Octanoate Mole Ratio | Carbon Disulfide/ Cobalt Octanoate Mole Ratio | Yield (%) | Tm (° C.) |
|---|---|---|---|---|
| C | 7/1 | 1/1 | 73 | 202.3 |
| D | 9/1 | 1/1 | 70 | 200.5 |

From Table 1 it can be seen that the yield of syndiotactic 1,2-polybutadiene was improved by increasing the inclusion of the diethyl fumarate as a co-catalyst from a yield of 53 percent to 70 percent by increasing the mole ratio of diethyl fumarate of cobalt octanoate from 3/1 to 9/1.

This, in one aspect, is considered herein to be significant because the inclusion of the diethyl fumarate co-catalyst was accompanied by the aforesaid reduction in use of the carbon disulfide by 90 percent (reflecting the aforesaid molar ratio of carbon disulfide to cobalt octanoate being reduced to 1/1 from the 10/1 ratio used in the catalyst of Example I which did not contain the diethyl fumarate co-catalyst), which, in turn, makes the removal of the aforesaid obnoxious odor stemming from the presence of the carbon disulfide much easier.

EXAMPLE III

Blend of Odorless Syndiotactic 1,2-Butadiene Polymer in Cis 1,4-Polyisoprene Rubber A blend of syndiotactic 1,2-butadiene polymer dispersed in cis 1,4-polyisoprene rubber was prepared.

For this preparation, 500 ml of a solution of 11.1 weight percent isoprene monomer in hexane solvent was added to a 0.946 liter dried glass bottle. The polymerization of the isoprene monomer was initiated by addition of a triisobutylaluminum (TIBA)/titanium tetrachloride/diphenyl ether based catalyst system. A 0.34 molar (M) titanium tetrachloride in hexane was used. The calculated molar ratios of the TIBA to the titanium tetrachloride and of the diphenyl ether to the TIBA were about 0.9/1 0.6/1, respectively.

The polymerization of the isoprene was allowed to proceed in the capped glass bottle at a temperature of about 50° C. for about 4 hours which resulted in a polyisoprene polymer containing cement. The polyisoprene polymer had a Mooney ML (1+4) viscosity at about 23° C. of about 77.

The polyisoprene cement was allowed to cool to about 23° C. following which 100 ml of a 18.6 weight percent solution of 1,3-butadiene monomer in hexane was added to and mixed with the polyisoprene cement. Polymerization of the 1,3-butadiene monomer was initiated by addition of 8 ml of a 25 weight percent solution of TIBA in hexane solvent, 2.5 ml of a 0.042 molar (M) solution of cobalt octanoate in hexane solvent and 0.2 ml of a neat carbon disulfide. The polymerization reaction was allowed to proceed at about 23° C., while shaking with a mechanical shaker for about 2 hours.

The polymerization was shortstopped by an addition of a solution containing 0.5 ml ethanol and 0.5 ml of a 30 weight percent of hydrogen peroxide in water and stabilized. The resulting polymer blend was recovered and dried in a vacuum oven.

The odorless blend of the syndiotactic 1,2-polybutadiene and cis 1,4-polyisoprene weighed about 43 grams and contained about 7.2 weight percent of the syndiotactic 1,2-polybutadiene polymer. The polymer blend was determined to have a glass transition temperature (Tg) of about −65° C. and a melting temperature (Tm) of about 202° C.

From this Example, it is concluded herein that a relatively odorless (in a sense of obnoxious level of carbon disulfide odor) syndiotactic 1,2-polybutadiene polymer can be prepared from a carbon disulfide-containing catalyst system.

EXAMPLE IV

Blend of Odorless Syndiotactic 1,2-Butadiene Polymer in SBR

A blend of syndiotactic 1,2-butadiene polymer dispersed in styrene/butadiene rubber (SBR) was prepared.

For this preparation, a cement of SBR was prepared by adding 0.4 ml of a 1 molar (M) n-butyl lithium in hexane and 0.1 ml of neat N,N,N',N'-tetramethylethylene diamine (TMEDA) to a 0.946 liter glass bottle containing 500 ml of a styrene/butadiene monomer premix (18.5 weight percent in hexane solvent). The ratio of styrene monomer to 1,3-butadiene monomer was 16/84.

The co-polymerization of the styrene and 1,3-butadiene monomers was allowed to proceed at about 65° C. for about 4 hours to form the SBR rubber. The SBR had a Tg of about −26° C. and a Mooney (1+4) viscosity at about 23° C. of about 7.

The resulting SBR cement was allowed to cool to about 23° C.

To the SBR cement was added 150 cc of 1,3-butadiene monomer premix (10 weight percent in hexane) followed by an addition of 10 ml of 25 weight percent triisobutylaluminum (TIBA), 0.4 ml of 0.42 molar (M) cobalt octanoate in hexane and 0.15 ml of neat carbon disulfide. The mixture was agitated in a mechanical shaker at about 23° C.

The polymerization reaction was shortstopped with a solution containing 0.5 ml or ethanol and 0.5 ml of hydrogen peroxide water solution and stabilized. The solvent was then evaporated and the resulting polymer mass vacuum dried at about 50° C.

The recovered blend of isotactic 1,2-butadiene polymer and styrene/butadiene rubber was odorless in a sense of being free from an obnoxious level of odor stemming from carbon disulfide, contained about 6.3 weight percent of the isotactic 1,2-butadiene polymer, had a Tg of about −26° C., melting point (Tm) of about 203° C. and a Mooney ML (1+4) viscosity at about 23° C. of about 60.

From this Example, it is concluded herein that a relatively odorless (significant reduction or elimination of presence of obnoxious odor stemming from presence of carbon disulfide component of a catalyst) blend of a syndiotactic 1,2-polybutadiene with other elastomers can be prepared using the novel hydrogen peroxide treatment of the polymerizate.

This is considered herein to be significant because carbon disulfide is often more soluble in other hydrocarbon-based elastomers (e.g. conjugated diene-based elastomers, including styrene/butadiene copolymer elastomers) as compared to more resinous syndiotactic 1,2-polybutadiene polymers. Accordingly, a greater challenge is presented in removing the aforesaid odorous carbon disulfide without the use of hydrogen peroxide presented by this invention.

While certain representative embodiments and details have been shown for the purpose of illustrating the invention, it will be apparent to those skilled in this art that various changes and modifications may be made therein without departing from the spirit or scope of the invention.

What is claimed is:

1. A process for the preparation of syndiotactic 1,2-polybutadiene polymer which comprises polymerizing 1,3-butadiene in an organic solvent solution in the presence of a catalyst system comprised of a combination of cobalt carboxylate, trialkyl aluminum, carbon disulfide and, optionally dialkyl fumarate, to form a polymerizate thereof and thereafter recovering said syndiotactic 1,2-polybutadiene from said polymerizate, wherein said process further comprises adding hydrogen peroxide to said polymerizate.

2. The process of claim 1 wherein said addition of said hydrogen peroxide is provided as a solution comprised of hydrogen peroxide and water and/or alcohol, wherein said alcohol is comprised of at least one of ethanol and isopropanol.

3. The process of claim 1 wherein said addition of said hydrogen peroxide is provided as a solution comprised of hydrogen peroxide and alcohol, wherein said alcohol is comprised of at least one of ethanol and isopropanol.

4. The process of claim 1 wherein said cobalt carboxylate is selected from cobalt octanoate, cobalt naphthenate and cobalt acetylacetonate.

5. The process of claim 1 wherein said cobalt carboxylate is cobalt octanoate.

6. The process of claim 1 wherein said trialkylaluminum is triethylaluminum.

7. The process of claim 1 wherein said trialkylaluminum is triisobutylaluminum.

8. The process of claim 1 wherein said dialkyl fumarate is selected from dimethyl fumarate, diethyl fumarate and dibutyl fumarate.

9. The process of claim 1 wherein said dialkyl fumarate is diethyl fumarate.

10. The process of claim 1 wherein said catalyst system is the product of a combination of cobalt naphthenate, triisobutyl aluminum and carbon disulfide.

11. The process of claim 1 wherein said catalyst system is the product of a combination of cobalt naphthenate, triisobutyl aluminum, diethyl fumarate and carbon disulfide.

12. A syndiotactic 1,2-polybutadiene polymer prepared by the process of claim 1 wherein at least a stoichiometric amount of hydrogen peroxide relative to said carbon disulfide is used and said recovered syndiotactic 1,2-polybutadiene is free of a significant level of obnoxious odor stemming from said carbon disulfide.

13. The process of claim 1 which further comprises preparing a composite of conjugated diene-based elastomer and syndiotactic 1,2-polybutadiene polymer which comprises first polymerizing at least one of isoprene and 1,3-butadiene monomers, or styrene and at least one of isoprene and butadiene monomers, in an organic solvent solution to form a polymerizate containing an elastomer thereof, followed by an addition of 1,3-butadiene monomer and said catalyst comprised of said trialkyl aluminum, cobalt carboxylate and carbon disulfide, and optionally said dialkyl fumarate, and polymerizing said added 1,3-butadiene to form a syndiotactic 1,2-polybutadiene polymer, wherein the resulting polymerizate of said conjugated diene-based elastomer and syndiotactic 1,2-polybutadiene polymer is treated with hydrogen peroxide and recovering said composite from said polymerizate.

14. The process of claim 13 wherein said conjugated diene-based elastomer of said composite is selected from cis 1,4-polyisoprene, cis 1,4-polybutadiene, isoprene/butadiene copolymer, styrene/isoprene/butadiene terpolymer and styrene/butadiene copolymer.

* * * * *